(12) United States Patent
Nammi et al.

(10) Patent No.: US 9,893,932 B2
(45) Date of Patent: Feb. 13, 2018

(54) METHOD AND APPARATUS FOR PILOT CONFIGURATION IN A MOBILE COMMUNICATIONS NETWORK

(71) Applicant: Telefonaktiebolaget L M Ericsson (publ), Stockholm (SE)

(72) Inventors: Sairamesh Nammi, Kista (SE); Yi-Pin Eric Wang, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 58 days.

(21) Appl. No.: 14/439,886

(22) PCT Filed: Jan. 14, 2014

(86) PCT No.: PCT/SE2014/050033
§ 371 (c)(1),
(2) Date: Apr. 30, 2015

(87) PCT Pub. No.: WO2014/112933
PCT Pub. Date: Jul. 24, 2014

(65) Prior Publication Data
US 2015/0312094 A1      Oct. 29, 2015

Related U.S. Application Data

(60) Provisional application No. 61/754,233, filed on Jan. 18, 2013.

(51) Int. Cl.
*H04L 12/24*      (2006.01)
*H04B 7/024*      (2017.01)
(Continued)

(52) U.S. Cl.
CPC ......... *H04L 41/0803* (2013.01); *H04B 7/024* (2013.01); *H04B 7/0413* (2013.01); *H04L 5/0048* (2013.01); *H04W 76/046* (2013.01)

(58) Field of Classification Search
None
See application file for complete search history.

(56) References Cited

U.S. PATENT DOCUMENTS

2008/0268887 A1   10/2008   Jansen et al.
2010/0027454 A1   2/2010    Hou et al.
(Continued)

FOREIGN PATENT DOCUMENTS

WO      2008058149 A2      5/2008
WO      WO2011144023      * 11/2011

OTHER PUBLICATIONS

Unknown, Author, "Combined Cell Deployment Scenarios in Heterogeneous Networks", Ericsson, 3GPP TSG RAN WG1 Meeting #71, R1-125220, New Orleans, USA, Nov. 12-16, 2012, 1-5.
(Continued)

*Primary Examiner* — Mohammad Adhami
(74) *Attorney, Agent, or Firm* — Murphy, Bilak & Homiller, PLLC

(57) ABSTRACT

Method and apparatus for pilot configuration in a mobile communications network There is provided a method of operating a central scheduler node in a mobile communications network when one or more mobile devices are located in the coverage area of a first base station and a second base station, the first base station and the second base station having a shared cell identity, the method comprising determining (101) the number of mobile devices that may benefit from a distributed multiple input/multiple output, D-MIMO, mode in which data is transmitted to a mobile device by the first base station and the second base station; and if the number of mobile devices that may benefit from a D-MIMO mode exceeds a threshold, causing (103, 107, 109) said mobile devices, the first base station and the second base station to be configured to operate in the D-MIMO mode.

16 Claims, 8 Drawing Sheets

(51) Int. Cl.
  *H04B 7/0413*  (2017.01)
  *H04L 5/00*    (2006.01)
  *H04W 76/04*   (2009.01)

(56) References Cited

U.S. PATENT DOCUMENTS

| | | | |
|---|---|---|---|
| 2010/0027456 A1 | 2/2010 | Onggosanusi et al. | |
| 2010/0067450 A1 | 3/2010 | Balachandran et al. | |
| 2012/0135771 A1* | 5/2012 | Futaki | H04B 7/024 455/509 |
| 2013/0077521 A1* | 3/2013 | Feng | H04W 36/0083 370/252 |
| 2013/0155968 A1* | 6/2013 | Pelletier | H04L 5/0023 370/329 |
| 2013/0156013 A1* | 6/2013 | Huang | H04W 72/04 370/336 |

OTHER PUBLICATIONS

Unknown, Author, "Views on heterogeneous deployment scenarios with distributed RRHs", CHTTL, HTC, 3GPP TSG RAN WG1 Meeting #64, R1-111006, Taipei, Taiwan, Feb. 21-25, 2011, 1-3.
Unknown, Author, "Heterogeneous Network Deployment Scenarios", Ericsson, ST-Ericsson, 3GPP TSG-RAN WG1 #70bis, R1-124513, San Diego, CA, USA, Oct. 8-12, 2012, 1-3.
Unknown, Author, "Initial considerations on Heterogeneous Networks for UMTS", Ericsson, ST-Ericsson, 3GPP TSG RAN WG1 Meeting #70bis, R1-124512, San Diego, CA, USA, Oct. 8-12, 2012, 1-7.
Unknown, Author, "Proposed SID: Study on UMTS Heterogeneous Networks", Huawei, HiSilicon, TSG RAN Meeting #57, RP-121436, Chicago, USA, Sep. 4-7, 2012, 1-5.
Unknown, Author, "CoMP Operation and UE Mobility", Alcatel-Lucent, Alcatel-Lucent Shanghai Bell, 3GPP TSG RAN WGI meeting#68, R1-120496, Feb. 6-10, 2012, 1-5.
Unknown, Author, "Impact of CoMP on Control Plane", CATT, 3GPP TSG RAN WG2 Meeting #67bis, R2-095488, Miyazaki, Japan, Oct. 12-16, 2009, 1-6.

* cited by examiner

METHOD AND APPARATUS FOR PILOT CONFIGURATION IN A MOBILE COMMUNICATIONS NETWORK

TECHNICAL FIELD

Embodiments herein relate generally to nodes in a heterogeneous mobile communications network and methods in the nodes. More particularly, the embodiments relate to the configuration of pilot signals when a MIMO-capable mobile device is located in the coverage area of multiple base stations of a combined cell in order to achieve spatial multiplexing gain.

BACKGROUND

During the last few years, cellular network operators have started to offer mobile broadband based on Wideband Code Division Multiple Access (VVCDMA)/High Speed Packet Access (HSPA). Fuelled by new mobile devices designed for data applications, the end user performance requirements have been steadily increasing. The large uptake of mobile broadband has resulted in significant growth in the traffic volumes that need to be handled by the HSPA networks. Therefore, techniques that allow cellular network operators to manage their network resources more efficiently are becoming increasingly important.

Standardised by the third Generation Partnership Project (3GPP), High Speed Packet Access (HSPA) supports the provision of voice services in combination with mobile broadband data services. HSPA comprises High Speed Downlink Packet Access (HSDPA), High Speed Uplink Packet Access (HSUPA) and HSPA+. HSDPA allows networks based on the Universal Mobile Telecommunications System (UMTS) to have higher data transfer speeds and capacity. In HSDPA, a new transport layer channel, High Speed Downlink Shared Channel (HS-DSCH), has been added to the UMTS release 5 and further specification. It is implemented by introducing three new physical layer channels: High Speed-Shared Control Channel (HS-SCCH), Uplink High Speed-Dedicated Physical Control Channel (HS-DPCCH) and High Speed-Physical Downlink Shared Channel (HS-PDSCH). The HS-SCCH informs the user equipment/mobile device that data will be sent on the HS-DSCH, 2 slots ahead. The HS-DPCCH carries acknowledgment information and current Channel Quality Indicator (CQI) of the user equipment. This value is then used by the base station to calculate how much data to send to the user equipments on the next or a future transmission. The HS-PDSCH is the channel mapped to the above HS-DSCH transport channel that carries actual user data.

Some techniques that can be used to improve the downlink performance for end users include 4-branch MIMO (multiple input, multiple output), multiflow communication, multi carrier deployment, etc. Since improvements in spectral efficiency per link are approaching theoretical limits, the next generation technology is about improving the spectral efficiency per unit area. In other words, the additional features for HSDPA need to provide a uniform user experience to users anywhere inside a cell by changing the topology of traditional networks. Currently 3GPP has been working on this aspect through studies of heterogeneous network structures (see for example RP-121436 "Study on UMTS Heterogeneous Networks", R1-124512 "Initial considerations on Heterogeneous Networks for UMTS" and R1-124513 "Heterogeneous Network Deployment Scenarios".

Traditionally, networks are arranged in a homogeneous structure, with the network comprising base stations (also known as Node Bs) arranged in a planned layout in which all base stations have similar transmit power levels, antenna patterns, receiver noise floors, and similar backhaul connectivity to the data network. Moreover, all base stations offer unrestricted access to consumer mobile devices (also known as User Equipments—UEs) in the network, and serve roughly the same number of mobile devices. Current wireless systems falling under this category include, for example, Global System for Mobile communications (GSM), WCDMA, HSPA, Long Term Evolution (LTE) and Worldwide Interoperability for Microwave Access (WiMAX).

More recently, heterogeneous mobile communications network structures have been considered. Heterogeneous networks are an efficient network deployment solution for satisfying the ever-increasing demand of mobile broadband services. In a heterogeneous network, a low- or lower-power node (LPN), for example a picocell, microcell or femtocell base station (NodeB), is placed in a traffic hot spot or coverage hole within the coverage area of a high- or higher-power node, for example a macrocell base station, to better serve nearby mobile devices. Deploying a low power node in a traffic hot spot may significantly reduce the load in the macro or other higher-power cell covering the area. The power at which the picocell, microcell or femtocell base stations transmit can be of the order of 2 Watts (W), which compares to around 40 W for a macrocell base station.

FIG. 1 shows an exemplary heterogeneous UMTS mobile communication network 2 that comprises a macrocell node/base station (NodeB) 4 that establishes a cell with a coverage area 6. Two low power nodes/base stations 8, 10 (for example femtocell base stations) are located within the coverage area 6 of the macrocell base station 4, each defining a respective coverage area 12, 14.

The base stations 4, 8, 10 are connected to a network node 16, such as a radio network controller, RNC, 16 which controls the base stations 4, 8, 10 and manages radio resources and mobility in the cell. The RNC 16 may connect directly to the macrocell base station 4, and connect via the Internet to the low power base stations 8, 10. The RNC 16 also connects the base stations 4, 8, 10 to higher parts of the network 2, such as the core network, CN (not shown in FIG. 1).

A mobile device (UE) 18 is shown in the coverage area 12 of low power base station 8 and the coverage area 6 of the macrocell base station 4.

In some heterogeneous network deployments, each of the cells defined by the macrocell base station 4 and low power base stations 8, 10 have respective cell identifiers, which means that the macrocell base station 4 and the low power base stations 8, 10 effectively define different cells. Simulations show that using low power base stations 8, 10 in a macrocell base station coverage area 6 in this way offers load balancing, which results in large gains in system throughput as well as cell edge user throughput. However, a disadvantage with this arrangement is that as each low power base station creates its own cell, it is necessary for the mobile device 18 to perform a soft handover from one low power base station 8, 10 to the macrocell base station 4 or to another of the low power base stations 8, 10, which means higher layer signalling is required to perform the handover.

However, in other heterogeneous network deployments, each of the low power base stations 8, 10 use the same (i.e. a shared) cell identifier as the macrocell base station 4, which means that the macrocell base station 4 and the low power base stations 8, 10 are part of the same cell and effectively 'assist' the macrocell base station 4 in providing service to the mobile device 18. This type of deployment is known as a shared or combined cell, and is generally illustrated in FIG. 2. In a combined cell, all the nodes (i.e. macrocell base station 4 and low power base stations 8, 10 are connected via high speed links 19, such as optical links. A central scheduler or controller (not shown) is connected to the RNC 16 and also to any one of the base stations (usually to the macrocell base station) and takes responsibility for collecting operational statistics information from network environment measurements. This type of deployment avoids the need for the mobile device 18 to perform frequent soft handovers, and thus avoids the need for additional higher layer signalling.

As described in "Heterogeneous Network Deployment Scenarios" (R1-124513), in a shared or combined cell deployment of low power base stations having the same cell identifier as the overlying macrocell base station (and a deployment where the low power base stations and the macrocell base station use the same frequency), it is possible for a mobile device to only receive data from one or more antennas of a single base station (e.g. macrocell base station 4 or low power base station 8 for mobile device 18, but not from both), or to operate such that it receives data from one or more antennas of both the macrocell base station and one or more low power base stations simultaneously (e.g. from both macrocell base station 4 and low power base station 8 for mobile device 18). This latter arrangement can be considered as a distributed MIMO (multiple-input, multiple-output) arrangement. The decision of which nodes to use to transmit data to a specific UE is made by the central scheduler/controller based on information provided by the UE or based on information from other sources.

Based on the possibility for there to be data transmission from different nodes, transmission modes in a combined cell deployment can be divided into:

a. Single Frequency Network (SFN): In this mode all nodes transmit the same pilot channel, and data and control information is transmitted from all the nodes. Note that in this case only one UE can be served from all the nodes at any instant in time. Hence this mode is useful for coverage improvement. Furthermore, this mode works for all legacy UEs (i.e. UEs not complying with the most recent releases of the standards). FIG. 3 provides an illustration of the transmissions of various channels in a SFN combined cell deployment. Thus, it can be seen that the HSDPA pilot channel (which is called the Primary Common Pilot Channel (P-CPICH) and is used for estimating the channel for computing the channel quality indicator (CQI) of the mobile device) and the same HS-SCCH and HS-PDSCH are transmitted by each of the nodes in the combined cell deployment (so a macrocell node and three low power nodes).

b. Node Selection with Spatial Re-use: In this mode, even though all the nodes transmit the same pilot channel; data and the control information transmitted from one node is different from that from every other (or at least one other node), i.e. one or more nodes will be serving a specific UE, while at the same time different data and control channel information will be sent to a different UE. Hence the spatial resources can be reused. This mode provides load balancing gains, which means the capacity of the combined cell can be increased significantly. FIG. 4 provides an illustration of the transmission of various channels in a spatial reuse combined cell deployment (the D-CPICH shown in FIG. 4 is a demodulation/Dedicated pilot channel used for estimating the channel for data demodulation). Thus, it can be seen that each of the nodes (which are not labelled as specific nodes but include a macrocell node and three low power nodes) each transmit the same P-CPICH, but each of the nodes transmit respective D-CPICH, HS-SCCH and HS-PDSCH channels (where a common shading pattern indicates that the node(s) is(are) transmitting to the same UE).

SUMMARY

As explained above, each of the modes provides gains under different deployment scenarios. For example, the SFN mode performs better under low load conditions and provides coverage. The node selection with spatial re-use mode performs better when the load of the cell is high. It is noted that all the UE categories as defined in the 3GPP standard will benefit with these modes. However, it is considered that Release-7 or MIMO capable UEs may benefit from additional operation modes.

In particular, for MIMO capable UEs, there are a number of ways to enable spatial reuse by utilizing existing or new MIMO operations. In principle, the multiple transmit antennas used by a MIMO transmitter can be distributed at different locations (i.e. distributed across multiple nodes in the heterogeneous network, such as macrocell base station 4 and low power base station 8, or two low power base stations). This MIMO operation mode is referred to as "MIMO mode with Spatially Separated Nodes" or Distributed MIMO (D-MIMO) herein. In this mode, one or more of the low power nodes act as part of a distributed MIMO, i.e. MIMO transmission with spatially separated antennas. In this mode, MIMO gains (both diversity and multiplexing gains) can be achieved. Since it is well known that distributed MIMO provides significant capacity gains (better than MIMO transmission with co-located antennas), using this approach the performance of the combined cell can be increased significantly.

In some cases, in the D-MIMO mode each node can transmit data to the UE that is different to the data transmitted to the UE by the other node(s). In other cases, in the D-MIMO each node is configured to transmit the same data to the UE as the other node(s). In other cases, MIMO precoding is used in the D-MIMO mode that allows a particular data block to be transmitted by any one or both of first and second nodes. MIMO precoding is carried out by applying a precoding weight to a data block. In the case where a particular data block is transmitted by both a first node and a second node, the first node and the second node may use different precoding weights for the data block.

Embodiments of this disclosure thus provide a method for configuring the pilot signals in a heterogeneous network thereby providing the coverage gains/spatial re-use gains, while at the same time providing multiplexing gains. In particular, the pilot configuration for a low power node is made adaptive on the number of UEs in the cell portion covered by the lower power node that may benefit from using the D-MIMO mode. In some embodiments, UEs that may benefit from using the D-MIMO mode are those UEs that are capable of supporting MIMO operations. In other embodiments, UEs that may benefit from using the D-MIMO mode are those UEs whose receiver type and/or measurements of a control channel meet some criteria.

According to a first aspect there is provided a method of operating a central scheduler node in a mobile communications network when one or more mobile devices are located in the coverage area of a first base station and a second base station, the first base station and the second base station having a shared cell identity, the method comprising determining the number of mobile devices that may benefit from a distributed multiple-input/multiple output, D-MIMO, mode in which data is transmitted to a mobile device by the first base station and the second base station; and if the number of mobile devices that may benefit from a D-MIMO mode exceeds a threshold, causing said mobile devices, the first base station and the second base station to be configured to operate in the D-MIMO mode.

In some embodiments, the method further comprises causing the first base station and the second base station to be configured to operate as a combined cell if the number of mobile devices that may benefit from the D-MIMO mode does not exceed the threshold.

In some embodiments, when the first base station and the second base station are configured to operate as a combined cell, the first base station and the second base station transmit the same pilot channel, and data and control information for a mobile device is transmitted from both the first base station and the second base station.

In other embodiments, when the first base station and the second base station are configured to operate as a combined cell, the first base station and the second base station transmit the same pilot channel, and data and control information transmitted by the first base station is different from the data and control information transmitted by the second base station.

In some embodiments, each base station transmits different data to the other base station when operating in the D-MIMO mode. In other embodiments, the first base station and the second base station are each configured to transmit the same data to the mobile device when operating in the D-MIMO mode. In other embodiments, MIMO precoding is used in the D-MIMO mode that allows a particular data block to be transmitted to the mobile device by one or both of the first base station and the second base station.

In some embodiments, the step of causing said mobile devices to be configured to operate in the D-MIMO mode comprises sending a signal to a network node in the network indicating one or more mobile devices that are to be configured to operate in the D-MIMO mode.

In some embodiments, the step of causing the first and second base stations to be configured to operate in the D-MIMO mode comprises sending a signal to at least one of the base stations to cause the base station to transmit a secondary control channel to the mobile devices that may benefit from the D-MIMO mode.

In some embodiments the step of determining the number of mobile devices that may benefit from a D-MIMO mode comprises determining the number of mobile devices that are capable of supporting MIMO transmissions.

In other embodiments, the step of determining the number of mobile devices that may benefit from a D-MIMO mode comprises determining the number of mobile devices for which a type of receiver in the mobile device and/or measurements of a pilot channel by the mobile device meet one or more criteria.

In some embodiments, the measurements of a pilot channel comprise measurements of a signal-to-interference-plus-noise ratio, SINR, or received power. The pilot channel may comprise a common pilot channel, CPICH.

In some embodiments, the one or more criteria comprises a threshold for the measurements of the pilot channel, and wherein the value of the threshold for each mobile device is set based on the type of receiver in the mobile device.

In some embodiments, the first base station is a high or higher power base station (i.e. a base station with a high or higher transmission power), and the second base station is a low or lower power base station (i.e. a base station with a low or lower transmission power or a base station with a lower transmission power than the first base station). In other embodiments, the first and second base stations are low power base stations.

According to a second aspect, there is provided a central scheduler node for use in a mobile communications network in which one or more mobile devices can be located in the coverage area of a first base station and a second base station, the first base station and the second base station having a shared cell identity, the node comprising a processing module configured to determine the number of mobile devices that may benefit from a distributed multiple-input/multiple output, D-MIMO, mode in which data is transmitted to a mobile device by the first base station and the second base station, and, if the number of mobile devices that may benefit from a D-MIMO mode exceeds a threshold, cause said mobile devices, the first base station and the second base station to be configured to operate in the D-MIMO mode.

In some embodiments, the processing module is further configured to cause the first base station and the second base station to be configured to operate as a combined cell if the number of mobile devices that may benefit from the D-MIMO mode does not exceed the threshold.

In some embodiments, when the first base station and the second base station are configured to operate as a combined cell, the first base station and the second base station transmit the same pilot channel, and data and control information for a mobile device is transmitted from both the first base station and the second base station.

In other embodiments, when the first base station and the second base station are configured to operate as a combined cell, the first base station and the second base station transmit the same pilot channel, and data and control information transmitted by the first base station is different from the data and control information transmitted by the second base station.

In some embodiments, each base station transmits different data to the other base station when operating in the D-MIMO mode. In other embodiments, the first base station and the second base station are each configured to transmit the same data to the mobile device when operating in the D-MIMO mode. In other embodiments, MIMO precoding is used in the D-MIMO mode that allows a particular data block to be transmitted to the mobile device by one or both of the first base station and the second base station.

In some embodiments, the processing module is configured to cause said mobile devices to be configured to operate in the D-MIMO mode by sending a signal to a network node in the network indicating the one or more mobile devices that are to be configured to operate in the D-MIMO mode.

In some embodiments, the processing module is configured to cause at least one of the first and second base stations to be configured for operating in the D-MIMO mode by sending a signal to the at least one base station to cause the base station to transmit a secondary control channel to the mobile devices that may benefit from the D-MIMO mode.

In some embodiments the processing module is configured to determine the number of mobile devices that may benefit from a D-MIMO mode by determining the number of mobile devices that are capable of supporting MIMO transmissions.

In other embodiments, the processing module is configured to determine the number of mobile devices that may benefit from a D-MIMO mode by determining the number of mobile devices for which a type of receiver in the mobile device and/or measurements of a pilot channel by the mobile device meet one or more criteria.

In some embodiments, the measurements of a pilot channel comprise measurements of a signal-to-interference-plus-noise ratio, SINR, or received power. The pilot channel may comprise a common pilot channel, CPICH.

In some embodiments, the one or more criteria comprises a threshold for the measurements of the pilot channel, and wherein the value of the threshold for each mobile device is set based on the type of receiver in the mobile device.

In some embodiments, the first base station is a high or higher power base station (i.e. a base station with a high or higher transmission power), and the second base station is a low or lower power base station (i.e. a base station with a low or lower transmission power or a base station with a lower transmission power than the first base station). In other embodiments, the first and second base stations are low power base stations.

According to a third aspect, there is provided a method of operating a network node, for example a radio network controller, RNC, in a mobile communications network when one or more mobile devices are located in the coverage area of a first base station and a second base station, the first base station and the second base station having a shared cell identity, the method comprising receiving an indication from a central scheduler of one or more mobile devices that are to be configured to operate in a distributed-multiple-input/multiple output, D-MIMO, mode in which data is transmitted to the mobile device by the first base station and the second base station; and sending a signal to each of the one or more mobile devices to cause the mobile devices to be configured to operate in the D-MIMO mode.

In some embodiments, the method further comprises receiving an indication from the central scheduler of one or more mobile devices that are to be configured to operate in a combined cell formed by the first base station and the second base station, and sending a signal to each of the one or more mobile devices to cause the mobile devices to be configured to operate in the combined cell.

In some embodiments, when the first base station and the second base station form a combined cell, the first base station and the second base station transmit the same pilot channel, and data and control information for a mobile device is transmitted from both the first base station and the second base station.

In other embodiments, when the first base station and the second base station form a combined cell, the first base station and the second base station transmit the same pilot channel, and data and control information transmitted by the first base station is different from the data and control information transmitted by the second base station.

In some embodiments, in the D-MIMO mode different data is transmitted by each base station to a particular mobile device. In other embodiments, in the D-MIMO mode the first base station is configured to transmit the same data to the mobile device as the second base station. In other embodiments, MIMO precoding is used in the D-MIMO mode that allows a particular data block to be transmitted by any one or both of the first base station and the second base station, In some embodiments, the step of sending a signal comprises sending a radio resource control, RRC, reconfiguration message that includes the configuration parameters for the D-MIMO mode.

In some embodiments, the first base station is a high or higher power base station (i.e. a base station with a high or higher transmission power), and the second base station is a low or lower power base station (i.e. a base station with a low or lower transmission power or a base station with a lower transmission power than the first base station). In other embodiments, the first and second base stations are low power base stations.

According to a fourth aspect, there is provided a network node, for example a radio network controller, RNC, for use in a mobile communications network in which one or more mobile devices can be located in the coverage area of a first base station and a second base station, the first base station and the second base station having a shared cell identity, the network node comprising a processing module configured to receive an indication from a central scheduler of one or more mobile devices that are to be configured to operate in a distributed-multiple-input/multiple output, D-MIMO, mode in which data is transmitted to the mobile device by the first base station and the second base station, and to send a signal to each of the one or more mobile devices to cause the mobile devices to be configured to operate in the D-MIMO mode.

In some embodiments, the processing module is further configured to receive an indication from the central scheduler of one or more mobile devices that are to be configured to operate in a combined cell formed by the first base station and the second base station, and sending a signal to each of the one or more mobile devices to cause the mobile devices to be configured to operate in the combined cell.

In some embodiments, when the first base station and the second base station form a combined cell, the first base station and the second base station transmit the same pilot channel, and data and control information for a mobile device is transmitted from both the first base station and the second base station.

In other embodiments, when the first base station and the second base station form a combined cell, the first base station and the second base station transmit the same pilot channel, and data and control information transmitted by the first base station is different from the data and control information transmitted by the second base station.

In some embodiments, in the D-MIMO mode different data is transmitted by each base station to a particular mobile device. In other embodiments, in the D-MIMO mode the first base station is configured to transmit the same data to the mobile device as the second base station. In other embodiments, MIMO precoding is used in the D-MIMO mode that allows a particular data block to be transmitted by any one or both of the first base station and the second base station, In some embodiments, the processing module is configured to send an RRC reconfiguration message to each of the one or more mobile devices that includes the configuration parameters for the D-MIMO mode.

In some embodiments, the first base station is a high or higher power base station (i.e. a base station with a high or higher transmission power), and the second base station is a low or lower power base station (i.e. a base station with a low or lower transmission power or a base station with a lower transmission power than the first base station). In other embodiments, the first and second base stations are low power base stations.

According to a fifth aspect, there is provided a method of operating a base station in a mobile communications network when one or more mobile devices are located in the coverage area of the base station and another base station, the base station and said other base station having a shared cell identity, the method comprising receiving an indication from a central scheduler that the base station is to operate in a distributed-multiple-input/multiple output, D-MIMO, mode in which data is transmitted to a mobile device by the base station and said other base station; and transmitting a secondary control channel signal to the mobile device.

In some embodiments, the method further comprises receiving an indication from the central scheduler that the base station is to operate in a combined cell formed by the base station and said other base station, and transmitting a primary control channel to the mobile device.

In some embodiments, when the base station and said other base station form a combined cell, the base station and said other base station transmit the same pilot channel, and data and control information for a mobile device is transmitted from both the base station and said other base station.

In other embodiments, when the base station and said other base station form a combined cell, the base station and said other base station transmit the same pilot channel, and data and control information transmitted by the base station is different from the data and control information transmitted by said other base station.

In some embodiments, in the D-MIMO mode the base station is configured to transmit different data to the mobile device than the data transmitted to the mobile device by said other base station. In other embodiments, in the D-MIMO mode the base station is configured to transmit the same data to the mobile device as said other base station. In other embodiments, MIMO precoding is used in the D-MIMO mode that allows a particular data block to be transmitted by any one or both of the base station and said other base station, In some embodiments, the secondary control channel signal is a Secondary Common Pilot Channel, S-CPICH.

In some embodiments the method further comprises the step of transmitting a primary control channel signal to the mobile device in addition to the secondary control channel signal, the transmitted primary control channel signal being the same as a primary control channel signal being transmitted by said other base station.

In some embodiments, the primary control channel signal is a Primary Common Pilot Channel, P-CPICH.

In some embodiments, the base station is a low or lower power base station (i.e. a base station with a low or lower transmission power), and said other base station is a high or higher power base station (i.e. a base station with a high or higher transmission power or a base station with a higher transmission power than the low or lower power base station). In other embodiments, the base station and said other base station are low power base stations.

According to a sixth aspect, there is provided a base station for use in a mobile communications network in which one or more mobile devices can be located in the coverage area of the base station and another base station, the base station and said other base station having a shared cell identity, the base station comprising a processing module configured to receive an indication from a central scheduler that the base station is to operate in a distributed-multiple-input/multiple output, D-MIMO, mode in which data is transmitted to a mobile device by the base station and said other base station, and to transmit a secondary control channel signal to the mobile device.

In some embodiments, the processing module is further configured to receive an indication from the central scheduler that the base station is to operate in a combined cell formed by the base station and said other base station, and to transmit a primary control channel to the mobile device.

In some embodiments, when the base station and said other base station form a combined cell, the base station and said other base station transmit the same pilot channel, and data and control information for a mobile device is transmitted from both the base station and said other base station.

In other embodiments, when the base station and said other base station form a combined cell, the base station and said other base station transmit the same pilot channel, and data and control information transmitted by the base station is different from the data and control information transmitted by said other base station.

In some embodiments, in the D-MIMO mode the base station is configured to transmit different data to the mobile device than the data transmitted to the mobile device by said other base station. In other embodiments, in the D-MIMO mode the base station is configured to transmit the same data to the mobile device as said other base station. In other embodiments, MIMO precoding is used in the D-MIMO mode that allows a particular data block to be transmitted by any one or both of the base station and said other base station, In some embodiments, the processing module is further configured to transmit a primary control channel signal to the mobile device in addition to the secondary control channel signal, the transmitted primary control channel signal being the same as a primary control channel signal being transmitted by said other base station.

In some embodiments, the base station is a low or lower power base station (i.e. a base station with a low or lower transmission power), and said other base station is a high or higher power base station (i.e. a base station with a high or higher transmission power or a base station with a higher transmission power than the low or lower power base station). In other embodiments, the base station and said other base station are low power base stations.

According to a seventh aspect, there is provided a method of operating a mobile device in a mobile communications network when the mobile device is located in the coverage area of a first base station and a second base station, the first base station and the second base station having a shared cell identity, the method comprising receiving a configuration signal from a network node (e.g. a radio network controller), the configuration signal comprising parameters for configuring the mobile device to operate in a distributed-multiple-input/multiple output, D-MIMO, mode in which data is transmitted to a mobile device by the first base station and the second base station; configuring the mobile device according to the parameters in the configuration signal; receiving a primary control channel signal from at least one of the first and second base stations; and receiving a secondary control channel signal from one of the first and second base stations.

In some embodiments, the method further comprises the steps of receiving a configuration signal from the network node, the configuration signal comprising parameters for configuring the mobile device to operate in a combined cell formed by the first base station and the second base station; configuring the mobile device according to the parameters in the configuration signal; and receiving a primary control channel from at least one of the first and second base stations.

In some embodiments, when the first base station and the second base station are configured to operate as a combined cell, the first base station and the second base station transmit the same pilot channel, and data and control information for a mobile device is transmitted from both the first base station and the second base station.

In other embodiments, when the first base station and the second base station are configured to operate as a combined cell, the first base station and the second base station transmit the same pilot channel, and data and control information transmitted by the first base station is different from the data and control information transmitted by the second base station.

In some embodiments, in the D-MIMO mode different data is transmitted by each base station to the mobile device. In other embodiments, in the D-MIMO mode the first base station is configured to transmit the same data to the mobile device as the second base station. In other embodiments, MIMO precoding is used in the D-MIMO mode that allows a particular data block to be transmitted by any one or both of the first base station and the second base station, In some embodiments, the method further comprises the step of computing channel quality indicators, CQIs, for the spatial channel comprising the primary control channel signal and the spatial channel comprising the secondary control channel signal.

In some embodiments, the primary control channel signal is a Primary Common Pilot Channel, P-CPICH, and the secondary control channel signal is a Secondary Common Pilot Channel, S-CPICH.

In some embodiments, the first base station is a high or higher power base station that transmits the primary control channel signal (i.e. a base station with a high or higher transmission power), and the second base station is a low or lower power base station that transmits the secondary control channel signal (i.e. a base station with a low or lower transmission power or a base station with a lower transmission power than the high or higher power base station). In other embodiments, the first and second base stations are low power base stations.

According to an eighth aspect, there is provided a mobile device for use in a mobile communications network in which the mobile device can be located in the coverage area of a first base station and a second base station, the first base station and the second base station having a shared cell identity, the mobile device comprising a processing module configured to receive a configuration signal from a network node (e.g. a radio network controller), the configuration signal comprising parameters for configuring the mobile device to operate in a distributed-multiple-input/multiple output, D-MIMO, mode in which data is transmitted to the mobile device by the first base station and the second base station; configure the mobile device according to the parameters in the configuration signal; receive a primary control channel signal from at least one of the first and second base stations; and receive a secondary control channel signal from one of the first and second base stations.

In some embodiments, the processing module is further configured to receive a configuration signal from the network node, the configuration signal comprising parameters for configuring the mobile device to operate in a combined cell formed by the first base station and the second base station; configure the mobile device according to the parameters in the configuration signal; and receive a primary control channel from at least one of the first and second base stations.

In some embodiments, when the first base station and the second base station are configured to operate as a combined cell, the first base station and the second base station transmit the same pilot channel, and data and control information for a mobile device is transmitted from both the first base station and the second base station.

In other embodiments, when the first base station and the second base station are configured to operate as a combined cell, the first base station and the second base station transmit the same pilot channel, and data and control information transmitted by the first base station is different from the data and control information transmitted by the second base station.

In some embodiments, in the D-MIMO mode different data is transmitted by each base station to the mobile device. In other embodiments, in the D-MIMO mode the first base station is configured to transmit the same data to the mobile device as the second base station. In other embodiments, MIMO precoding is used in the D-MIMO mode that allows a particular data block to be transmitted by any one or both of the first base station and the second base station, In some embodiments, the processing module is further configured to compute channel quality indicators, CQIs, for the spatial channel comprising the primary control channel signal and the spatial channel comprising the secondary control channel signal.

In some embodiments, the primary control channel signal is a Primary Common Pilot Channel, P-CPICH, and the secondary control channel signal is a Secondary Common Pilot Channel, S-CPICH.

In some embodiments, the first base station is a high or higher power base station that transmits the primary control channel signal (i.e. a base station with a high or higher transmission power), and the second base station is a low or lower power base station that transmits the secondary control channel signal (i.e. a base station with a low or lower transmission power or a base station with a lower transmission power than the high or higher power base station). In other embodiments, the first and second base stations are low power base stations.

According to a ninth aspect, there is provided a computer program product having computer readable code embodied therein, the computer readable code being configured such that, on execution by a suitable computer or processing module, the computer or processing module performs any of the methods described above.

BRIEF DESCRIPTION OF THE DRAWINGS

Embodiments will now be described, by way of example only, with reference to the following drawings, in which.

DETAILED DESCRIPTION

Figure 1:
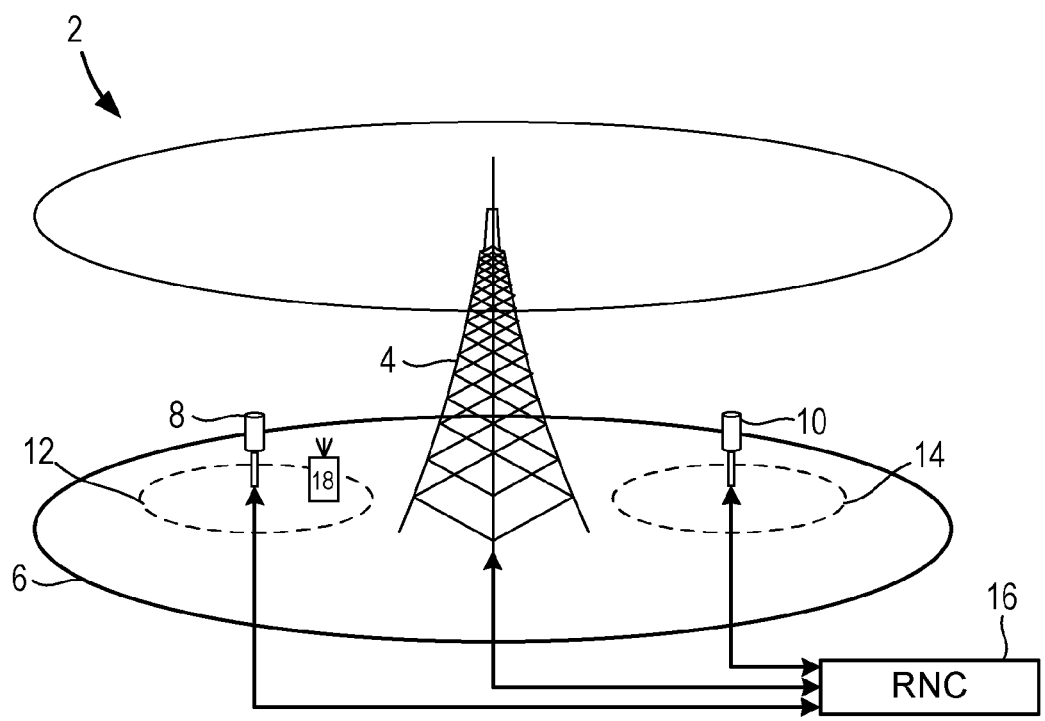
FIG. 1 is an illustration of an exemplary heterogeneous mobile communications network.
Figure 2:
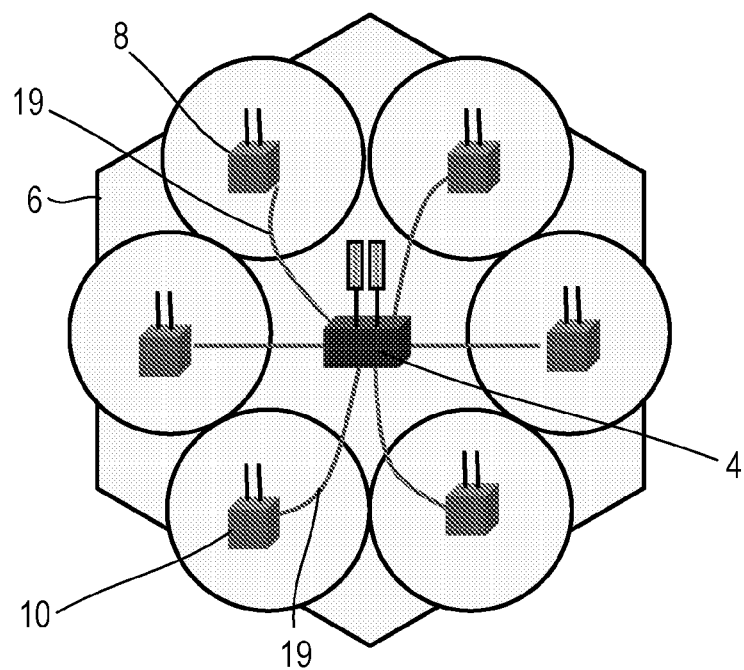
FIG. 2 is an illustration of a shared or combined cell in a heterogeneous mobile communications network.

In the discussion that follows, specific details of particular embodiments of the present invention are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, application-specific integrated circuits (ASICs), programmable logic arrays (PLAs), digital signal processors (DSPs), reduced instruction set processors, field programmable gate arrays (FPGAs), state machines capable of performing such functions, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the present invention may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although embodiments described below refer to a UMTS mobile communications network, it will be appreciated that the teachings of this application are applicable to other types of network in which a heterogeneous arrangement of base stations can be used.

In addition, the embodiments described below refer to low (transmission) power base stations (otherwise referred to herein as low power nodes or LPNs) within the coverage area of a macrocell base station (otherwise referred to herein as a macrocell node or a high or higher (transmission) power node), but it will be appreciated that the teachings of this application are applicable to any type of heterogeneous deployment of nodes (e.g. a picocell base station within the coverage area of a microcell base station, a microcell base station within the coverage area of a macrocell base station, or a femtocell base station within the coverage area of any of a picocell, microcell or macrocell base station).

Figure 5:
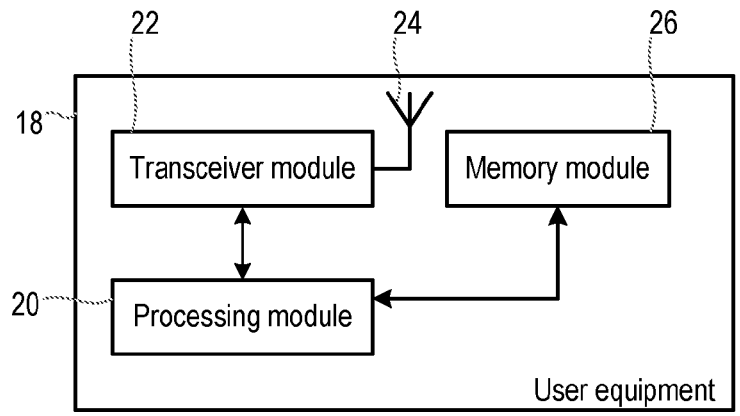
FIG. 5 is a block diagram of a user equipment.

FIG. 5 shows a UE 18 (mobile device) that can be used in one or more of the embodiments described below. The UE 18 comprises a processing module 20 that controls the operation of the UE 18. The processing module 20 is connected to a receiver or transceiver module 22 with one or more (e.g. two or four for a MIMO-capable UE) associated antenna(s) 24 which are used to receive signals from one or more base stations 4, 8, 10 in the network 2. The user equipment 18 also comprises a memory module 26 that is connected to the processing module 20 and that stores information and data (e.g. computer program code) required for the operation of the UE 18, including data received from the network 2 and data to be transmitted over the network 2.

Figure 6:
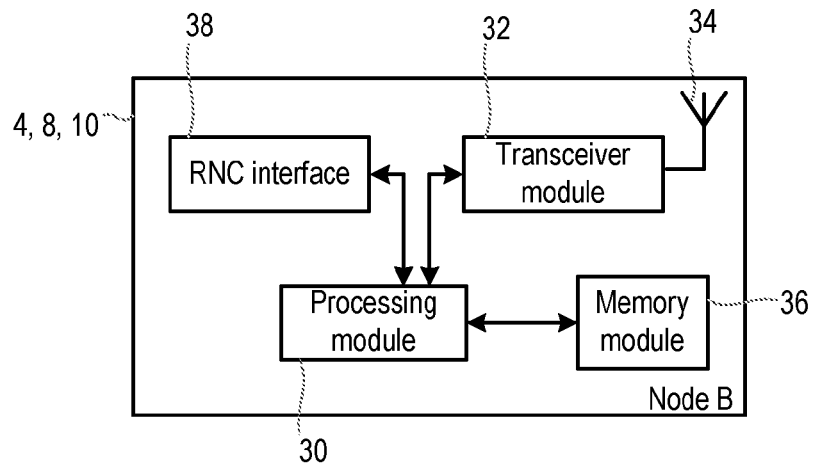
FIG. 6 is a block diagram of a base station.

FIG. 6 shows a base station 4, 8, 10 (called a Node B in UMTS) that can be used in one or more of the embodiments described below. Although in practice a low power base station 8, 10 will not be identical in size and structure to a macrocell base station 4, for the purposes of this description, the base stations 4, 8, 10 are considered to comprise the same components. Thus, the base station 4, 8, 10 comprises a processing module 30 that controls the operation of the base station 4, 8, 10. The processing module 30 is connected to a transceiver module 32 with one or more associated antenna(s) 34 which are used to transmit signals to, and receive signals from, user equipments 18 in the network 2. The base station 4, 8, 10 also comprises a memory module 36 that is connected to the processing module 30 and that stores information and data (e.g. computer program code) required for the operation of the base station 4, 8, 10. The base station 4, 8, 10 also includes components and/or circuitry 38 for allowing the base station 4, 8, 10 to exchange information with the RNC 16 (which is typically via the Iub interface).

In some embodiments, for example where the base station is a macrocell base station 4, the processing module 30 can also implement the functions of the central scheduler required according to the embodiments described below, or otherwise be configured to connect to another network node that implements the central scheduler. In that case, the structure of the network node that implements the central scheduler can be similar to that described below for the RNC 16.

Figure 7:
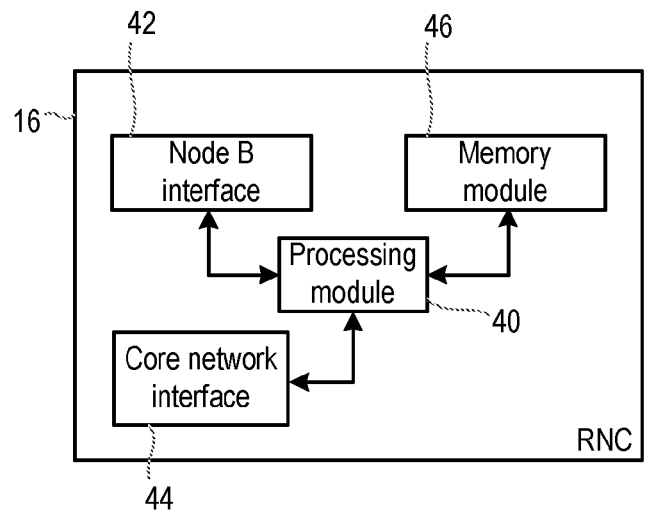
FIG. 7 is a block diagram of a radio network controller.

FIG. 7 shows the components of a network node 16, such as a radio network controller (RNC) 16 that can be used in one or more of the embodiments described below. The RNC 16 comprises a processing module 40 that controls the operation of the RNC 16. The processing module 40 is connected to components and/or circuitry 42 for allowing the RNC 16 to exchange information with the base stations 4, 8, 10 with which it is associated (which is typically via the Iub interface), and components or circuitry 44 for allowing the RNC 16 to exchange information with the core network (which is typically via the Iu-CS and/or Iu-PS interface). The RNC 16 also comprises a memory module 46 that is connected to the processing module 40 and that stores information and data (e.g. computer program code) required for the operation of the RNC 16.

It will be appreciated that, for simplicity, only components of the UE 18, Node B 4, 8, 10 and RNC 16 required to illustrate the methods described below are shown in FIGS. 5, 6 and 7.

As described above, for MIMO capable UEs, there are a number of ways to enable spatial reuse by utilizing existing or new MIMO operations. In particular, the transmit antennas in the macrocell base station 4 and the low power base station 8 (or alternatively antennas in two low power base stations) can be operated together as a MIMO transmitter that is distributed in different locations. This MIMO operation mode is referred to herein as "MIMO mode with Spatially Separated Nodes" (and also as distributed-MIMO or D-MIMO), and in this mode, one or more of the low power nodes act as part of a distributed MIMO, i.e. MIMO transmission with spatially separated antennas. In this mode, MIMO gains (both diversity and multiplexing gains) can be achieved. Since it is well known that distributed MIMO provides significant capacity gains (better than MIMO transmission with co-located antennas), using this approach the performance of a combined cell can be increased significantly.

In some cases, in the D-MIMO mode each node can transmit data to the UE that is different to the data transmitted to the UE by the other node(s). In other cases, in the D-MIMO each node can transmit the same data to the UE as the other node(s). In other cases, MIMO precoding is used in the D-MIMO mode that allows a particular data block to be transmitted by any one or both of first and second nodes. MIMO precoding is carried out by applying a precoding weight to a data block. In the case where a particular data block is transmitted by both a first node and a second node, the first node and the second node may use different precoding weights for the data block.

Figure 8:
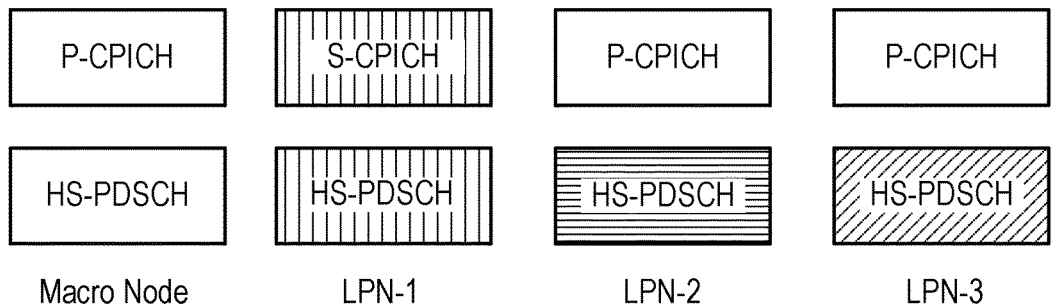
FIG. 8 is an illustration of one way of utilising a MIMO mode with spatially separated nodes.
Figure 9:
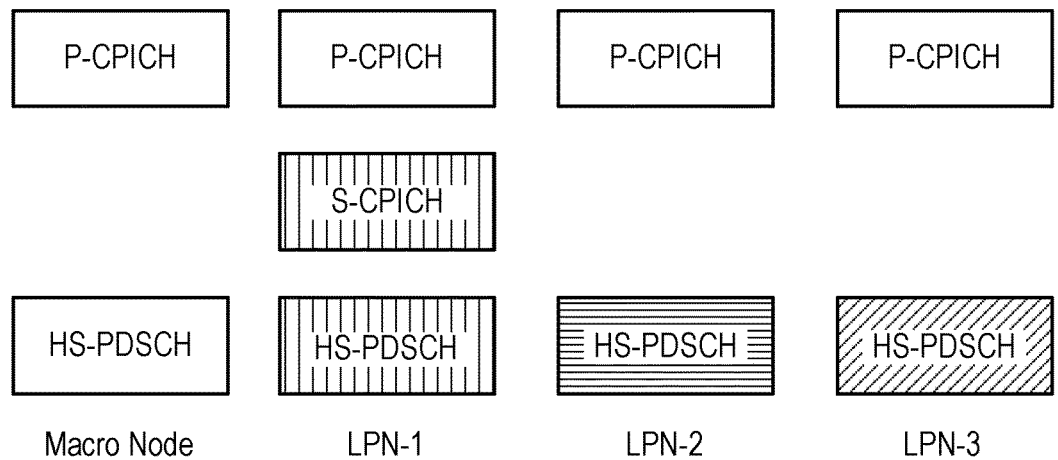
FIG. 9 is an illustration of another way of utilising a MIMO mode with spatially separated nodes.

FIGS. 8 and 9 illustrate two ways in which the macrocell base station 4 and the low power base stations 8, 10 in the combined cell (or more generally multiple base stations operating as a combined cell) can be operated to implement a MIMO mode with spatially separated nodes. In FIGS. 8 and 9, the macrocell base station 4 is labelled as 'macro node', the low power base station 8 in whose coverage area the MIMO capable mobile device 18 (and potentially one or more other MIMO-capable UEs) is located is labelled 'LPN-1' and two other low power base stations are shown (which are labelled LPN-2 and LPN-3).

As shown in FIG. 8, a key difference in implementing the MIMO mode with spatially separated nodes as compared to the SFN and "node selection with spatial re-use" modes is in the way pilots are configured, and in particular some nodes (i.e. LPN-1) need to transmit a secondary common pilot channel (S-CPICH) rather than the P-CPICH.

In this case, the MIMO-capable UE 18 in the cell portion of LPN-1 sees two spatial channels. The first spatial channel is the channel experienced by P-CPICH, which is the combined channel including all the paths from the macro node, LPN-2 and LPN-3 to the UE 18. The second spatial channel is the one experienced by S-CPICH, which includes only paths from LPN-1 to the UE 18. The UE will measure CQI based on the P-CPICH and S-CPICH, respectively.

FIG. 9 shows a second example, which is similar to that shown in FIG. 8 (i.e. LPN-1 transmits a S-CPICH), except that LPN-1 also transmits the same P-CPICH as the other nodes (i.e. macro node, LPN-2 and LPN-3). Thus, the channel experienced by P-CPICH includes the paths from the macro node, LPN-1, LPN-2 and LPN-3 to the UE 18. This gives a higher probability that the CQI associated with the channel experienced by P-CPICH will be higher from the perspective of the MIMO-capable UE 18.

Figure 10:
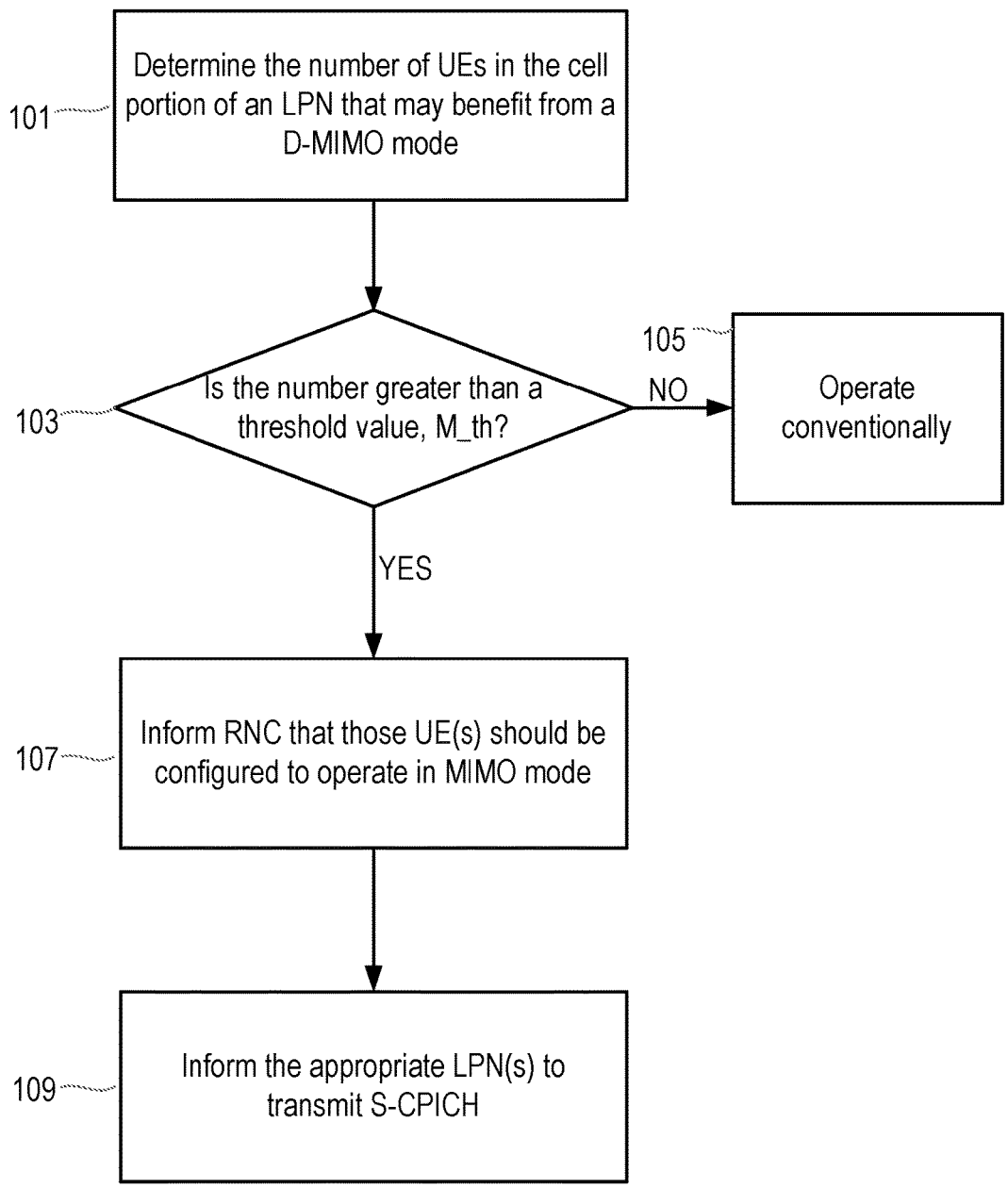
FIG. 10 is a flow chart illustrating a method of operating a central scheduler.
Figure 11:
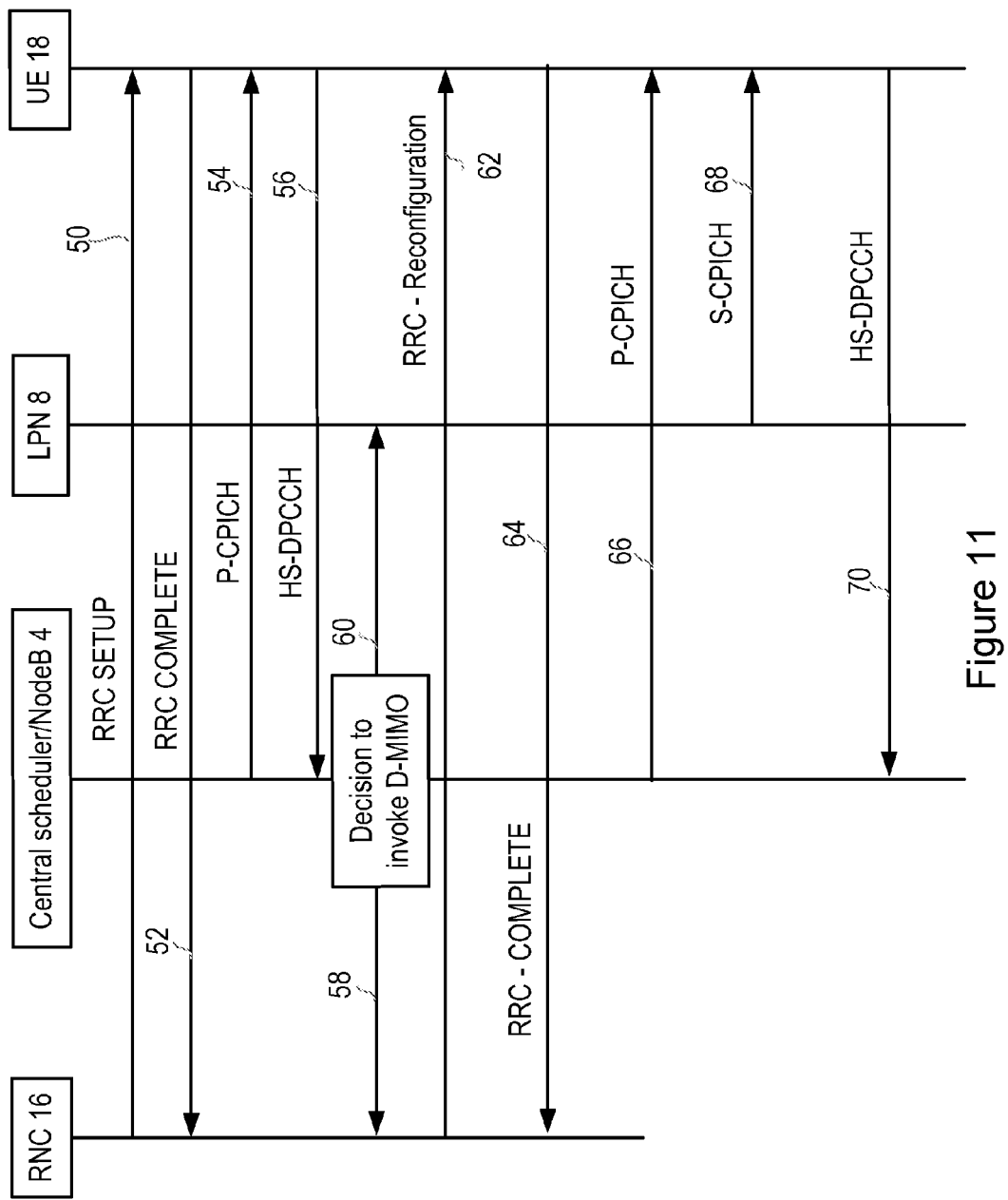
FIG. 11 is a diagram illustrating the signalling between the nodes and a UE.
Figure 12:
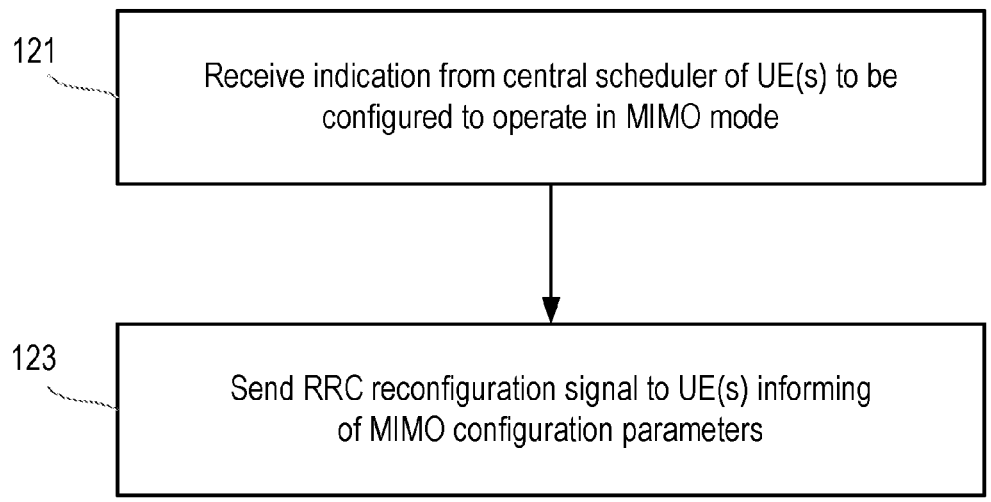
FIG. 12 is a flow chart illustrating a method of operating an RNC.
Figure 13:
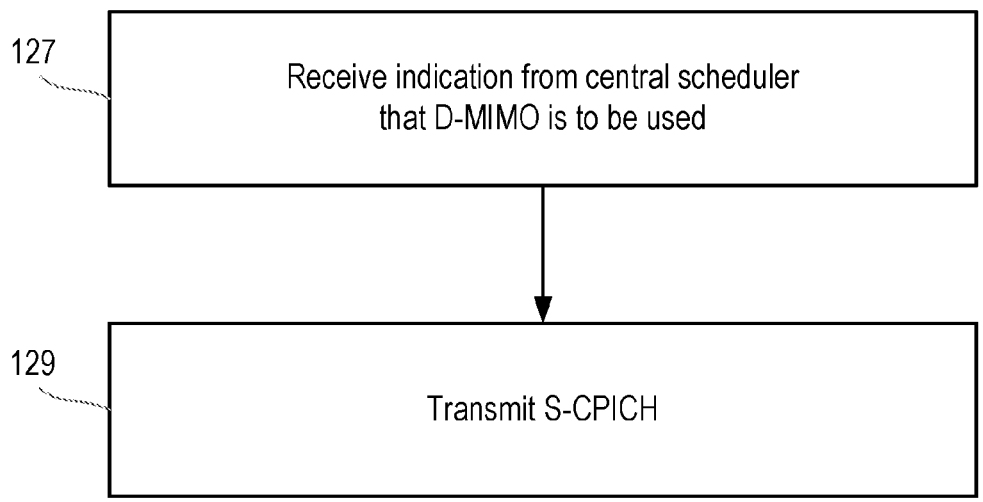
FIG. 13 is a flow chart illustrating a method of operating a low power node.
Figure 14:
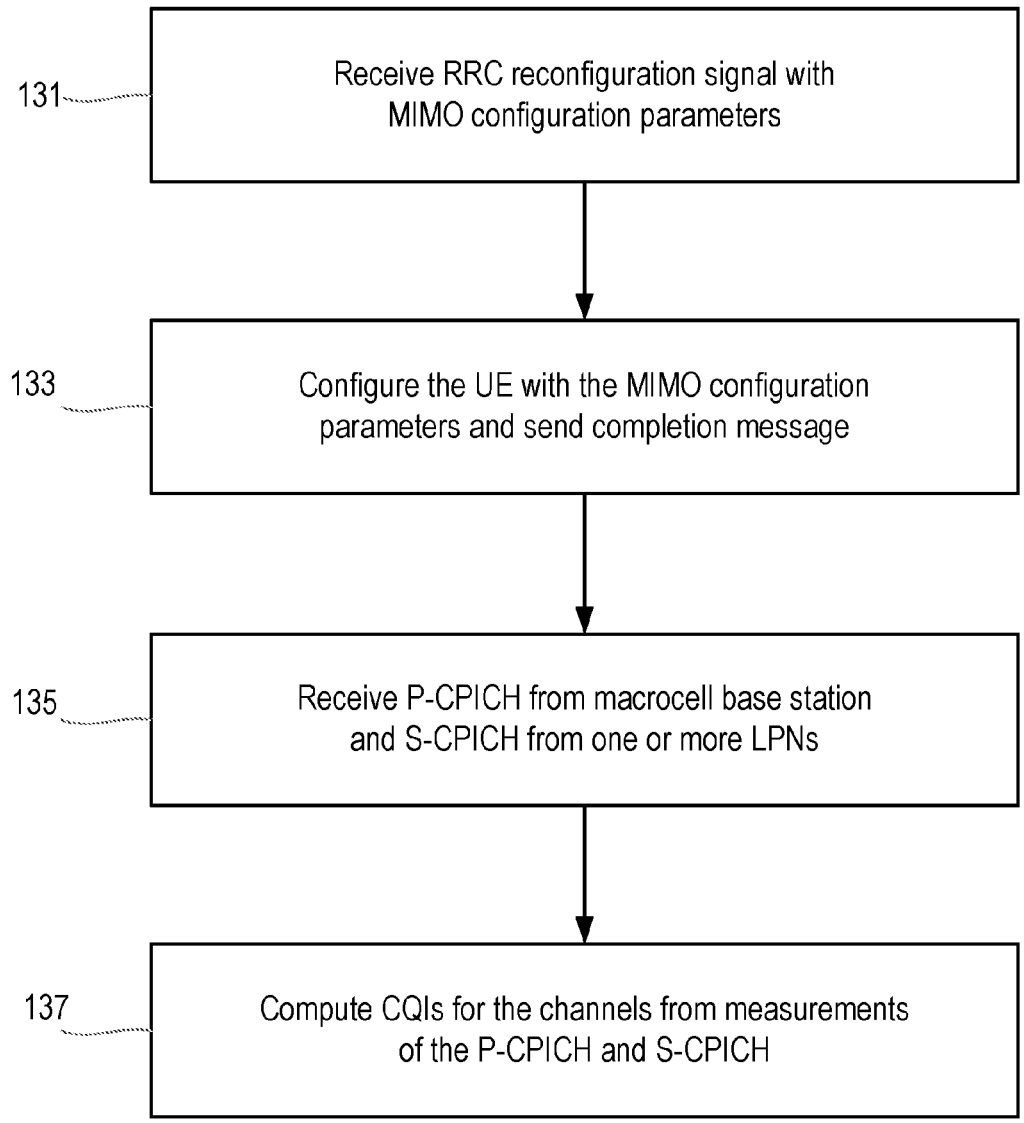
FIG. 14 is a flow chart illustrating a method of operating a mobile device.

FIG. 10 is a flow chart illustrating a method of operating a central scheduler (which is assumed in the following to be part of a macrocell base station 4, but could in alternative embodiments be a separate node that is connected to the macrocell base station 4) to determine whether to operate in a D-MIMO mode for one or more UEs 18, and if so, to configure pilot signals for the D-MIMO operation mode. FIG. 11 is a signalling diagram showing the corresponding signals transmitted between the central scheduler/macrocell base station 4, the RNC 16, LPN 8 and UE 18. FIG. 12 illustrates a method of operating an RNC 16, FIG. 13 illustrates a method of operating a LPN 8 and FIG. 14 illustrates a method of operating a UE 18 in accordance with the embodiments. Each of these methods corresponds to the situation where the D-MIMO mode is implemented using antennas in the macrocell base station 4 and low power base station 8, but it will be appreciated by those skilled in the art how to adapt the methods for the situation where the D-MIMO mode is implemented using antennas in two low power base stations.

In the first step of the method of operating the central scheduler, step 101, which can take place during cell set up, the central scheduler determines whether the UEs 18 in a portion of the combined cell covered by a particular low power base station (e.g. LPN 8) may benefit from the use of D-MIMO mode.

In some embodiments, step 101 comprises the central scheduler determining the capabilities of UEs 18 in a portion of the combined cell covered by a particular low power base station (e.g. LPN 8). In particular, the central scheduler determines whether each UE is MIMO-capable. The UE 18 has to indicate its capabilities through radio resource control (RRC) signalling at the time of cell set up, and the central scheduler can either obtain the UE capability information from the RNC (to which the RRC signalling was sent) or determine the information directly from the UE 18.

In other embodiments, in step 101 the central scheduler determines whether a UE 18 may benefit from the use of D-MIMO mode by determining whether the type of receiver in the UE 18 and/or the measurements of a pilot channel (e.g. CPICH) meet one or more criteria. In particular, MIMO mode is more beneficial when external interference (e.g. thermal noise and/or interference from neighboring cells) is relatively weaker. If the external interference is too strong for a MIMO capable mobile device, the D-MIMO mode may not offer any performance benefit.

A MIMO-capable mobile device may indicate in a message to the network, such as a mobility measurement report, a pilot channel (e.g. CPICH, or primary-CPICH) signal quality measurement (e.g. signal-to-interference-plus-noise ratio (SINR) or received power). The measurement report may include measurements for the combined cell under consideration, and optionally neighboring combined cells and/or separate cells with different cell IDs. If the received power or SINR on the pilot channel is high, e.g. 15 dB in the serving combined cell, this implies that the interference from neighboring cells (either neighboring combined cells or separate cells; these neighboring cells have different cell IDs) is relatively low. The scheduler can therefore apply criteria in the form of a signal quality threshold (e.g. SINR or received power threshold) to determine whether a mobile device may benefit from the MIMO mode. For example, the SINR threshold can be 10 dB. In this example, a mobile device that reports a 15 dB SINR for a pilot channel (e.g. CPICH) will be determined to be able to benefit from the D-MIMO mode.

In some embodiments, the signal quality (e.g. SINR) threshold may be dependent on the type of receiver in the transceiver module of the mobile device, and in particular dependent on whether the type of receiver in the device has the capability to cancel interference between multiple MIMO data blocks. For example, if the receiver in the mobile device cannot cancel such interference, the SINR threshold can be set to a higher value, e.g. 10 dB; however if the mobile device can cancel such MIMO interference, the SINR threshold can be set to a lower value, e.g. 7 dB.

Thus, it can be determined whether a mobile device may benefit from the D-MIMO mode based on a reported signal quality measurement (e.g. SINR) on a pilot channel (e.g. CPICH) and a static signal quality threshold, or a receiver type-dependent signal quality threshold.

Figure 3:
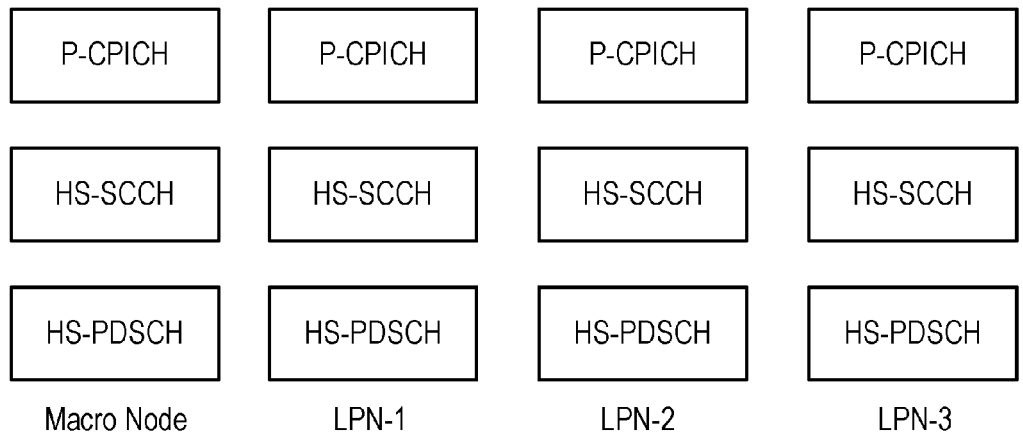
FIG. 3 is an illustration of transmissions in a single frequency network (SFN) form of combined cell deployment.
Figure 4:
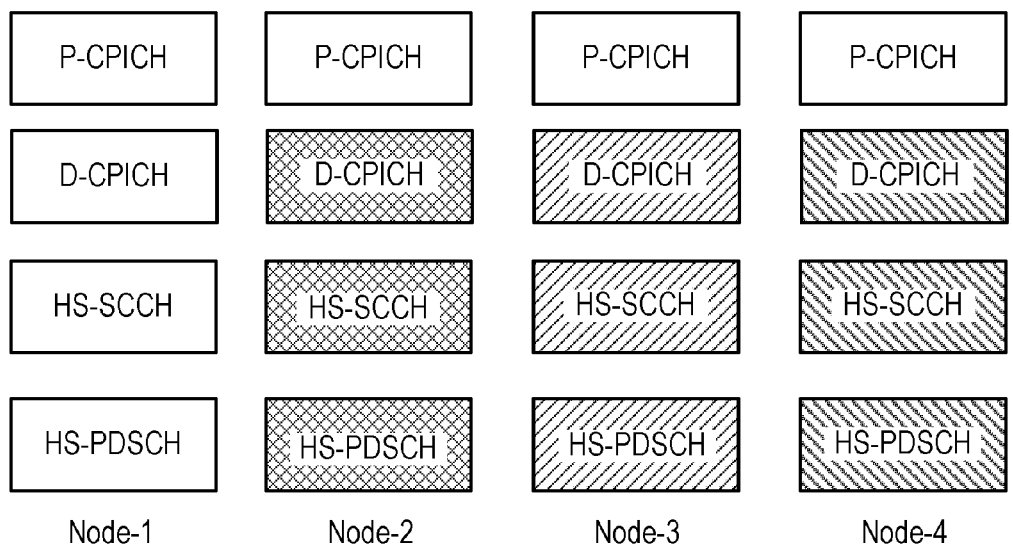
FIG. 4 is an illustration of transmissions in a spatial reuse form of combined cell deployment.

In step 103, the number of UEs 18 in the portion of the combined cell covered by LPN 8 identified in step 101 that may benefit from the D-MIMO mode is compared to a threshold value, M_Th. The threshold M_th can be set to a value that balances the increase in interference caused by one or more low power nodes starting to transmit S-CPICH when operating in the D-MIMO mode against the number of UEs which can benefit from the D-MIMO mode and thus increase the system throughput. If the number of UEs 18 that may benefit from the D-MIMO mode (e.g. in one embodiment, the number of MIMO capable UEs 18) is equal to or less than the threshold, the central scheduler allows the combined cell to be set up conventionally (step 105), using a conventional configuration for the pilot signals (for example as shown in FIG. 3 or 4).

This conventional set-up is illustrated in the first part of FIG. 11. In particular, the RNC 16 sends an RRC setup message 50 to the UE 18 to configure the UE 18 for operation in the combined cell. The UE 18 responds to the RNC 16 with an RRC complete message 52.

The macrocell base station 4 and all the LPNs then transmit the P-CPICH 54 which is received by the UE 18 and used to measure CQIs. The UE 18 transmits the CQIs to the macrocell base station 4/central scheduler in the Uplink High Speed-Dedicated Physical Control Channel (HS-DPCCH) 56.

However, if in step 103 the number of UEs 18 identified in step 101 that may benefit from the D-MIMO mode (e.g. in one embodiment, the number of MIMO capable UEs 18) is greater than the threshold, the central scheduler determines that the UE(s) 18 should operate in the MIMO mode with spatially separated nodes (D-MIMO).

In that case, the central scheduler informs the RNC 16 of the relevant UEs 18 that are to be configured to operate in the D-MIMO mode (step 107). This is shown in FIG. 11 as signal 58.

The central scheduler also sends a signal 60 to the appropriate LPN(s) 8 informing them that D-MIMO is to be used and therefore to start transmitting S-CPICH (step 109 in FIG. 10).

When the RNC 16 receives signal 58 from the central scheduler (step 121 of FIG. 12), the RNC 16 sends an RRC reconfiguration message 62 to the affected UE(s) 18 informing them of the configuration parameters required for MIMO operation (step 123 of FIG. 12). The configuration parameters can include any of an indication of the pilot codes used for S-CPICH, an indication of the power offset values and CQI power offset, an indication of the CQI report period, etc.

When the relevant LPN(s) 8 receive signal 60 from the central scheduler indicating that D-MIMO is to be used (step 127 of FIG. 13), the LPN 8 starts transmitting the S-CPICH (step 129 and signal 68 in FIG. 11). As shown above in FIG. 9, in addition to the LPN 8 transmitting the S-CPICH 68, if the LPN 8 has two transmit antennas, the LPN 8 may also transmit the same P-CPICH 66 as the macrocell base station 4 and any other LPNs in the combined cell not involved in the D-MIMO operation mode (the transmission of this P-CPICH by the LPN 8 is not shown in FIG. 11). The central scheduler, based on information on the capability of the LPN 8 (such as the number of transmit antennas), can determine whether the LPN 8 should transmit the P-CPICH in addition to the S-CPICH.

In the MIMO-capable UE 18, on receipt of the RRC reconfiguration message 62 from the RNC 16 (step 131 in FIG. 14), the UE 18 reconfigures itself in accordance with the MIMO configuration parameters included in the RRC reconfiguration message 62 (step 133).

The UE 18 then signals that the reconfiguration is complete by sending an RRC complete message 64 back to the RNC 16 (part of step 133).

The UE 18 is then configured for D-MIMO operation and receives the P-CPICH signal 66 transmitted by the macrocell base station 4 (and any other LPN the UE 18 is in range of) and the S-CPICH 68 from LPN 8 (step 135).

The UE 18 then computes the CQIs for the channels from the macrocell base station and LPN 8 respectively from measurements of the received P-CPICH 66 and S-CPICH 68.

The UE 18 transmits the CQIs to the macrocell base station 4/central scheduler in the Uplink High Speed-Dedicated Physical Control Channel (HS-DPCCH) 70.

Therefore, there is provided a method that enables a central scheduler in or associated with a combined cell to determine whether to operate part or all of the cell according to a MIMO mode with spatially separated nodes, and if so, to configure the pilot signals transmitted by the relevant base stations (e.g. a macrocell base station and low power base stations, or multiple low power base stations) to enable this mode to be realised. As described above, operating a combined cell in this mode enables MIMO gains to be achieved with spatially separated nodes, and it is also possible to maintain the coverage and spatial re-use gains associated with known modes of operation of combined cells.

Modifications and other variants of the described embodiment(s) will come to mind to one skilled in the art having the benefit of the teachings presented in the foregoing descriptions and the associated drawings. Therefore, it is to be understood that the embodiment(s) is/are not to be limited to the specific examples disclosed and that modifications and other variants are intended to be included within the scope of this disclosure. Although specific terms may be employed herein, they are used in a generic and descriptive sense only and not for purposes of limitation.

The invention claimed is:

1. A method of operating a central scheduler node in a mobile communications network when one or more mobile devices are located in the coverage area of a first base station and a second base station, the first base station and the second base station having a shared cell identity, the method comprising:

determining the number of mobile devices that may benefit from a distributed multiple-input/multiple-output (D-MIMO) mode in which data is transmitted to a mobile device by the first base station and the second base station having the shared cell identity; and responsive to determining that the number of mobile devices that may benefit from a D-MIMO mode exceeds a threshold, causing said mobile devices, the first base station and the second base station to operate in the D-MIMO mode.

2. The method of claim 1, wherein the first base station and the second base station are configured to transmit different data to the mobile device when operating in the D-MIMO mode.

3. The method of claim 1, wherein the first base station and the second base station are each configured to transmit the same data to the mobile device when operating in the D-MIMO mode.

4. The method of claim 1, wherein MIMO precoding is used in the D-MIMO mode that allows a particular data block to be transmitted to the mobile device by one or both of the first base station and the second base station.

5. The method of claim 1, wherein the step of causing said mobile devices to operate in the D-MIMO mode comprises sending a signal to a network node in the network, the signal indicating one or more mobile devices that are to operate in the D-MIMO mode.

6. The method of claim 1, wherein the step of causing the first and second base stations to operate in the D-MIMO mode comprises sending a signal to at least one of the base stations to cause the base station to transmit a secondary control channel to the mobile devices that may benefit from the D-MIMO mode.

7. The method of claim 1, wherein the step of determining the number of mobile devices that may benefit from a D-MIMO mode comprises determining the number of mobile devices that are capable of supporting MIMO transmissions.

8. The method of claim 1, wherein the step of determining the number of mobile devices that may benefit from a D-MIMO mode comprises determiningthe number of mobile devices for which a type of receiver in the mobile device and/or measurements of a pilot channel by the mobile device meet one or more criteria.

9. The method of claim 8, wherein the measurements of a pilot channel comprise measurements of a signal-to-interference-plus-noise ratio (SINR) or received power.

10. The method of claim 8, wherein the pilot channel comprises a common pilot channel (CPICH).

11. The method of claim 8, wherein the one or more criteria comprises a threshold for the measurements of the pilot channel, and wherein the value of the threshold for each mobile device is set based on the type of receiver in the mobile device.

12. A central scheduler node for use in a mobile communications network in which one or more mobile devices can be located in the coverage area of a first base station and a second base station, the first base station and the second base station having a shared cell identity, the node comprising:

a processing circuit configured to determine the number of mobile devices that may benefit from a distributed multiple-input/multiple-output (D-MIMO) mode in which data is transmitted to a mobile device by the first base station and the second base station having the shared cell identity, and, in response to determining that the number of mobile devices that may benefit from a D-MIMO mode exceeds a threshold, cause said mobile devices, the first base station and the second base station to operate in the D-MIMO mode.

13. A node as defined in claim 12, wherein the processing circuit is configured to cause the mobile devices that may benefit from the D-MIMO mode to operate in the D-MIMO mode by sending a signal to a network node in the network indicating the one or more mobile devices that are to operate in the D-MIMO mode.

14. A node as defined in claim 12, wherein the processing circuit is configured to cause at least one of the first and second base stations to operate in the D-MIMO mode by sending a signal to the at least one base station to cause the base station to transmit a secondary control channel to the mobile devices.

15. A node as defined in claim 12, wherein the processing circuit is configured to determine the number of mobile devices that may benefit from a D-MIMO mode by determining the number of mobile devices that are capable of supporting MIMO transmissions.

16. A node as defined in claim 12, wherein the processing circuit is configured to determine the number of mobile devices that may benefit from a D-MIMO mode by determining the number of mobile devices for which a type of receiver in the mobile device and/or measurements of a pilot channel by the mobile device meet one or more criteria.

* * * * *